Patented June 23, 1925.

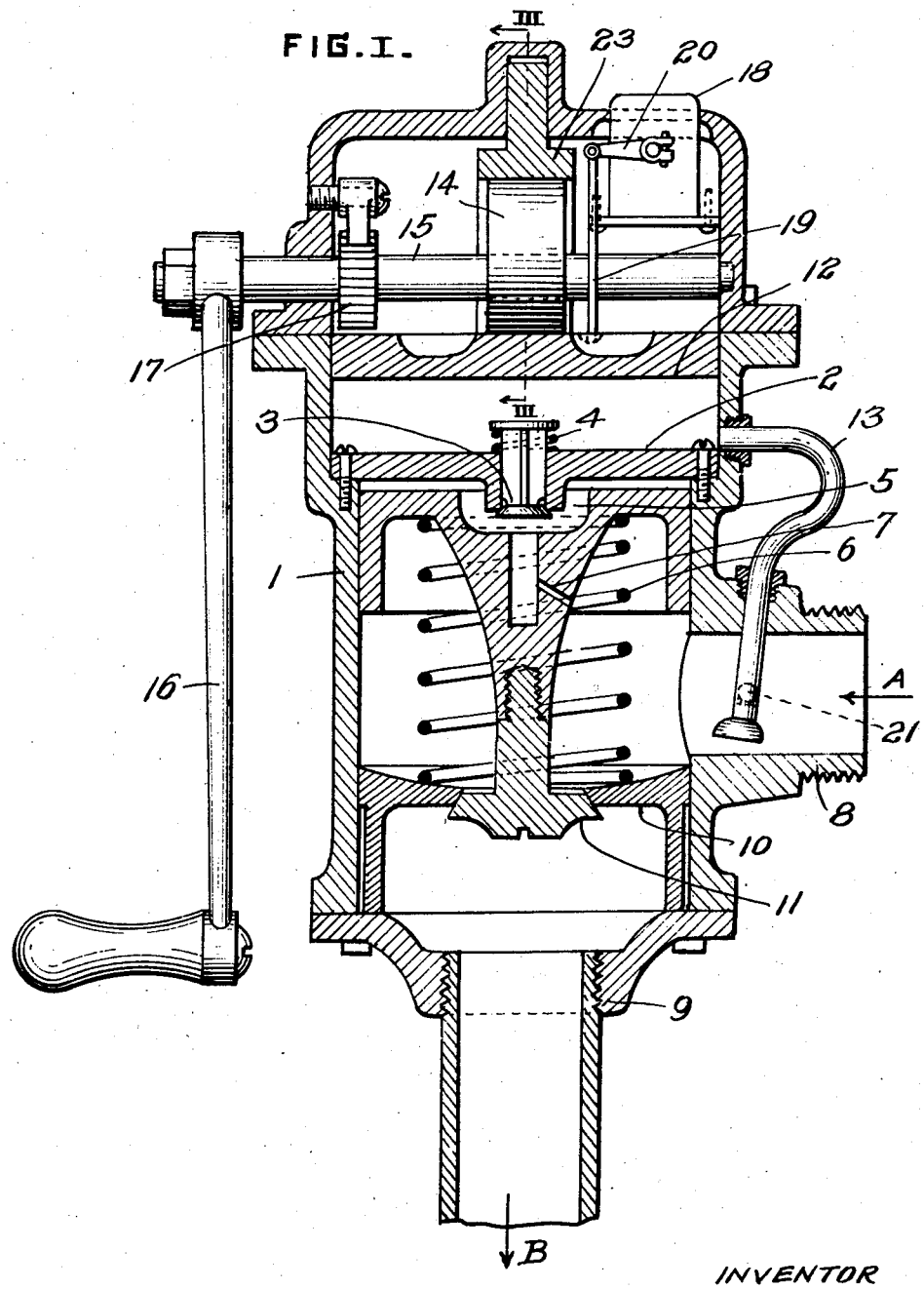

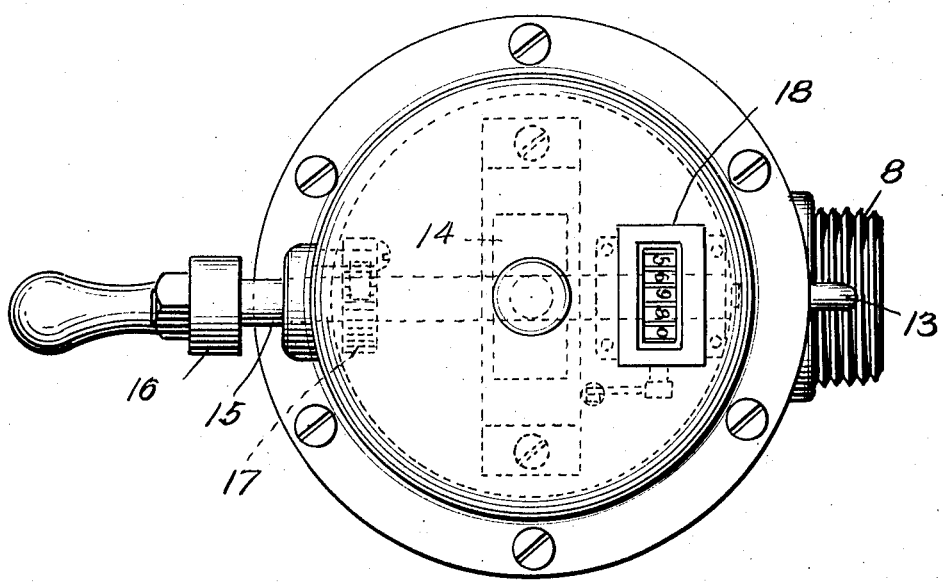
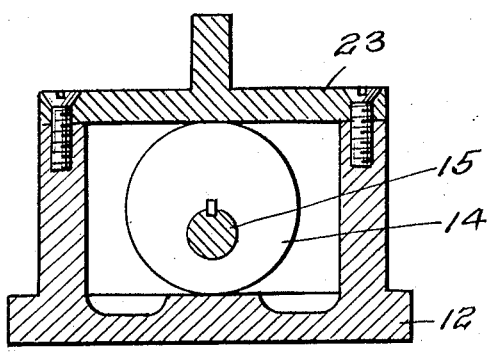

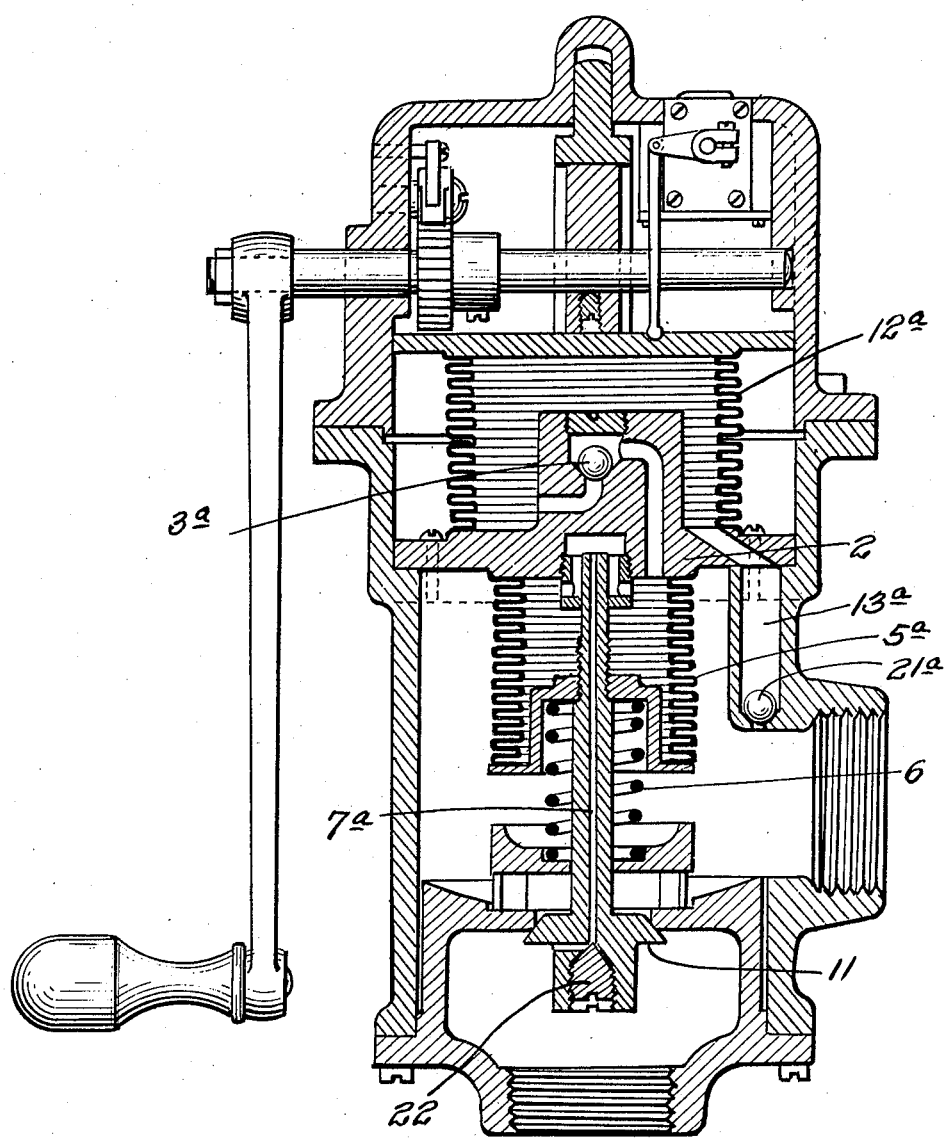

1,542,948

UNITED STATES PATENT OFFICE.

GEORGE W. MacKENZIE, OF BEAVER, PENNSYLVANIA, ASSIGNOR TO GUARANTEE LIQUID MEASURE COMPANY, OF ROCHESTER, PENNSYLVANIA, A CORPORATION OF DELAWARE.

LIQUID-DISPENSING APPARATUS.

Application filed October 25, 1924. Serial No. 745,851.

*To all whom it may concern:*

Be it known that I, GEORGE W. MACKENZIE, residing at Beaver, in the county of Beaver and State of Pennsylvania, a citizen of the United States, have invented or discovered certain new and useful Improvements in Liquid-Dispensing Apparatus, of which improvements the following is a specification.

My invention relates to improvements in liquid-dispensing apparatus, and, while it is applicable generally where measurement volumetrically of liquid advancing through a conduit is desired, it finds particular application in gasoline vending apparatus, and in that application I shall show and describe it.

My invention as I have developed it for practical purposes is embodied in an attachment, adapted to be added to fixtures commonly in use for measuring and dispensing gasoline, and in its operation it affords a check upon the accuracy and the honesty of operation of fixtures of that general sort. Gasoline-dispensing fixtures commonly include a cylindrical tank of glass, adapted alternately to take in and to discharge approximately five gallons of gasoline. The attachment in which my invention particularly resides, being applied to such a piece of dispensing apparatus, will afford a check in the matter of accuracy, so that even though the fixture to which it is applied be faulty in the accuracy of its mensuration, my superadded apparatus will insure accuracy of delivery, gallon by gallon. Furthermore, in these fixtures as they ordinarily are used, there is no tally to register the actual amount of gasoline delivered, nor is there any check upon the honesty of the employee who operates the apparatus. The attachment in which my invention is found is adapted to include a tally and may, therefore, in use, afford a desirable record, and in addition to that it may afford a check upon the honesty of the attendant, as well as upon the accuracy of the fixture to which it is attached.

My invention is illustrated in the accompanying drawings, in which Fig. I is a view in vertical and medial section of apparatus embodying my invention and adapted to be added to the ordinary gasoline dispensing fixture, whatever be the particular structure and organization of that fixture. Fig. II is a view of the apparatus in plan from above, and Fig. III is a view in vertical section of a detail of the structure, on the plane indicated by the line III—III, Fig. I. Fig. IV is a view similar to Fig. I and illustrating a modification.

Into the line of delivery A—B, of the gasoline dispensing fixture, my attachment is introduced. It includes a cylindrical casing 1, divided by a transverse partition 2, into an upper intake cylinder and a lower delivery cylinder. The partition 2 is ported, and in the port a valve 3 is arranged. This valve is a check valve, opening in the direction of flow from the intake cylinder through the port in the partition to the delivery cylinder. A spring 4 is provided, tending to hold the valve 3 normally to its seat.

In the delivery cylinder a piston 5 is reciprocable. This piston 5, under yielding force, tends always to stand at the extreme limit of its traverse toward the partition 2, and to that end it is backed by a spring 6. The piston 5 is ported, as indicated at 7, and the port is a narrow port, and in effective size it may be minutely varied, to achieve the ends presently to be described.

The delivery cylinder at the end opposite the partition 2, and beyond the range of traverse of the piston 5, is preferably in communication with the line of flow of gasoline from A to B. To that end, the casing 1 is provided in its side wall with the intake lead 8, and in its end wall with the delivery lead 9. Between the opening of the lead 8 into the casing 1, and the delivery lead 9, a web 10 extends across the cylinder. This web is ported, and in the port is a valve 11. This valve is carried by the stem of the piston 5. As the piston 5 reciprocates in the delivery cylinder, the valve 11 opens and closes, and so controls the flow of gasoline from A to B.

Means are provided for segregating from a larger volume and for introducing within the delivery cylinder unit volumes of liquid. These means are found in a piston 12 reciprocable in the intake cylinder within casing 1, in an intake lead 13, in which is arranged a return-flow preventing check valve 21, opening to the intake cylinder at a point beneath the range of reciprocation of piston 12, and in means for imparting to piston 12 reciprocation within definite limits: that is to say, for imparting to piston 12 a definite stroke. To this end, piston 12 carries a yoke 23, whose particular structure will be clearly understood on comparing Figs. I and III. Within this yoke lies a roller 14, which is carried as an eccentric disk upon a rotatable shaft 15, and means such as the crank arm 16 are provided for rotating the shaft 15 manually. A pawl and ratchet device 17 may be provided, to prevent retrograde turning of shaft 15. As shaft 15 is turned, it will be perceived that piston 12 is reciprocated through a predetermined range. If then the lead 13 to the intake cylinder be at its remote end connected with a liquid supply, it will be understood that with each up stroke of piston 12, a unit of volume will be segregated within the intake cylinder, and that on each down stroke of the piston 12, a corresponding unit of volume will be forced through the port in the partition 2 and into the delivery cylinder, beneath piston 5. There is, as has been said, a check-valve 21 in the lead 13. Furthermore, the lead 13 conveniently is arranged as shown in Fig. I, taking its supply of liquid from the body of liquid advancing from the point A to the point B through lead 8 to the delivery lead 9. The intake cylinder then, with its piston 12, and with the connections described, is a pump, for pumping units of volume successively into the delivery cylinder.

Operation will be readily understood. After the operation of the usual fixture, an approximately accurately segregated volume of gasoline under a substantially constant head enters at point A through the delivery lead 8 and fills the delivery cylinder beneath piston 5 and above partition 10. At the beginning, of course, piston 5, under the impulsion of spring 6, is at the extreme upper limit of its range of reciprocation, and valve 11 is closed. Further, in consequence of prior consecutive operations, all of the spaces between the two pistons 5 and 12 and the induction conduit 13 are full of gasoline.

Such being the initial condition, the attendant turns the crank 16. With every revolution, the piston 12 makes one complete reciprocation up and down. With each up stroke piston 12 draws into the intake cylinder a unit volume of gasoline. With each down stroke it forces into the delivery cylinder and beneath piston 5 a corresponding unit of gasoline. So long as there is in the delivery cylinder and above piston 5 any volume of gasoline whatever, in excess of the minimum, and so long as (in consequence of the presence of such excess) piston 5 is depressed against the resistance of spring 6, the valve 11 will be unseated and gasoline will be flowing from A to B, and thence to the place of delivery. Always, as long as this condition obtains, the tension of spring 6 will be forcing a relatively small stream of gasoline through orifice 7, and in consequence, piston 5 will always be moving toward the extreme upward limit of its reciprocation (this movement may, however, be masked under an equal or greater movement imposed upon it in opposite direction). Proportionately as liquid passes through orifice 7, valve 11 tends to return to its seat.

Considering first the segregation within the intake cylinder of a single unit of gasoline and the transfer of a unit from one side of partition 2 to the other side, let it be supposed that, after one complete revolution, the turning of the shaft be arrested. Then during all the time, while the unit of volume segregated in the delivery cylinder is escaping through orifice 7, valve 11 will be remote from its seat and gasoline will be in course of delivery. The volumetric delivery of valve 11 will then be in definite relation to the rate of flow through the orifice 7. The strength of the spring 6 and the size of the orifice 7 are minutely adjusted to the conditions of head, so that the valve remains open for exactly the time requisite to effect delivery of a known unit of gasoline.

It is to be remarked that, under the tension of spring 6 the delivery valve 11 is self-closing. This is a matter of great practical importance, particularly when the matter of fire-hazard comes to be considered.

The reciprocations of piston 12 may in their effect be cumulative. Manifestly, with one reciprocation liquid will begin to stream through orifice 7. It is not necessary to wait until a whole unit has so streamed through, but the attendant may keep turning the crank 16, and in so doing may keep filling unit after unit through the orifice in partition 2, and so adding unit to unit within the delivery cylinder and above piston 5, and while it is true that as this accumulation of gasoline in the delivery cylinder is going on, the escape through duct 7 is going on, still the accumulation will have no effect to disturb normal operation, but, according to the number of units pumped into the delivery cylinder, a corresponding number of units of the same, or of another value, will pass beneath valve 11. Ordinarily, the stroke of piston 12 and the size of duct 7 will be so minutely proportioned and adjusted to the size of the port controlled by valve 11, that with each turn of the shaft 15 a relatively small unit of gasoline will be pumped into the delivery cylinder, and correspondingly, with the escape of each unit through duct 7 and the consequent reciprocation of piston 5, one gallon will be delivered to the purchaser.

It remains to say that, while it is possible to count the number of turns given to the crank, my attachment makes possible the provision of a tally 18, in which the successive reciprocations of piston 12 may be recorded. To this end a push rod 19, adapted to be engaged by piston 12 in its reciprocation, engages a crank arm 20 on the operating shaft of the tally 18.

It should be remarked that, in case the turning of the crank 16 should be arrested at an intermediate point, the piston 5 would continue to function and bring the valve 11 to its seat.

Fig. IV serves to indicate that in place of the cylinder 1 with fixed walls, and the pistons 5 and 12 reciprocable therein, as shown in Fig. I, the expansible chambers may be chambers whose walls are lengths of sylphon tubing, 5ª and 12ª. Other small adaptations to conditions of economical production and continued service will be seen in the incorporation of the passageway 13ª in the body casting; in the arrangement of the duct 7ª within the valve-stem; and in the provision of an adjustable block 22, to constitute a needle-valve adjustment, controlling the effective size of this duct. The discharge through duct 7ª is made to the flowing stream beyond valve 11.

I claim as my invention:

1. In a liquid-dispensing apparatus the combination of a container provided with a discharge orifice, a valve controlling said orifice, a chamber provided with a delivery orifice, means for segregating from a larger volume and within said chamber a unit volume of liquid, means for expelling liquid from said chamber and through said delivery orifice, the means last named being operatively connected with the valve first named.

2. In liquid-dispensing apparatus the combination of a container provided with a discharge orifice, a valve controlling said orifice, an intake chamber and a delivery chamber having movable walls, and both being of expansible and collapsible capacity, interconnection between said chambers, a valve controlling communication through such interconnection, an induction port opening to said intake chamber, a delivery port opening from said delivery chamber, means for expanding and collapsing through a given range the intake chamber, and yielding means tending always to maintain the delivery chamber collapsed, the aforesaid valve in the discharge orifice being operatively connected with a movable wall of the delivery chamber.

3. In liquid-dispensing apparatus the combination of a container provided with a discharge orifice, a valve controlling said orifice, a plate, an intake and a delivery chamber both of expansible and collapsible capacity, consisting each of a length of sylphon tube arranged upon opposite sides of and both closed by said plate, a port through said plate through which communication is had from intake to delivery chamber, a check-valve in said port, an induction port opening to said intake chamber, a delivery port opening from said delivery chamber, means for expanding and collapsing through a predetermined range the length of sylphon tube which forms the wall of said intake chamber, and yielding means tending always to maintain in collapsed condition the length of sylphon tube which forms the wall of the delivery chamber, the aforesaid valve in the discharge orifice being operatively connected with the length of sylphon tube which forms the wall of the delivery chamber.

4. In liquid-dispensing apparatus the combination of a container provided with a discharge orifice, a valve controlling said orifice, an intake and a delivery chamber both of expansible and collapsible capacity, interconnection between said chambers, a check-valve arranged in such interconnection and opening in the direction of flow from intake to delivery chamber, an induction passageway opening from said container to said intake chamber, a delivery passageway opening from said delivery chamber to said container, means for expanding and contracting through a predetermined range the capacity of the intake chamber, and yielding means tending always to maintain the delivery chamber collapsed to minimum capacity, the collapsing wall of the delivery chamber being operatively connected with the valve first named.

5. In liquid-dispensing apparatus the combination of a ported conduit through which liquid may flow, a valve controlling the port in said conduit, a chamber provided with a discharge orifice leading to said conduit, means for drawing from the said conduit and segregating within said chamber a unit volume of liquid, means for expelling from said chamber and through the discharge orifice thereof liquid so segregated, the means last named being operatively connected with the valve first named.

6. In liquid-dispensing apparatus the combination of a ported conduit through which liquid may flow, a valve controlling the port in said conduit, a chamber with expansible and collapsible walls, said chamber communicating with the conduit first named and the walls thereof carrying the valve first named, and means for pumping from the conduit first named and delivering to said chamber unit volumes of liquid.

In testimony whereof I have hereunto set my hand.

GEORGE W. MacKENZIE.

Witnesses:
PERCY A. ENGLISH,
FRIEDA E. WOLFF O'BRIEN.